Aug. 25, 1931.    R. C. SMALLEY    1,820,839
TUBE SUPPORT
Filed March 10, 1930
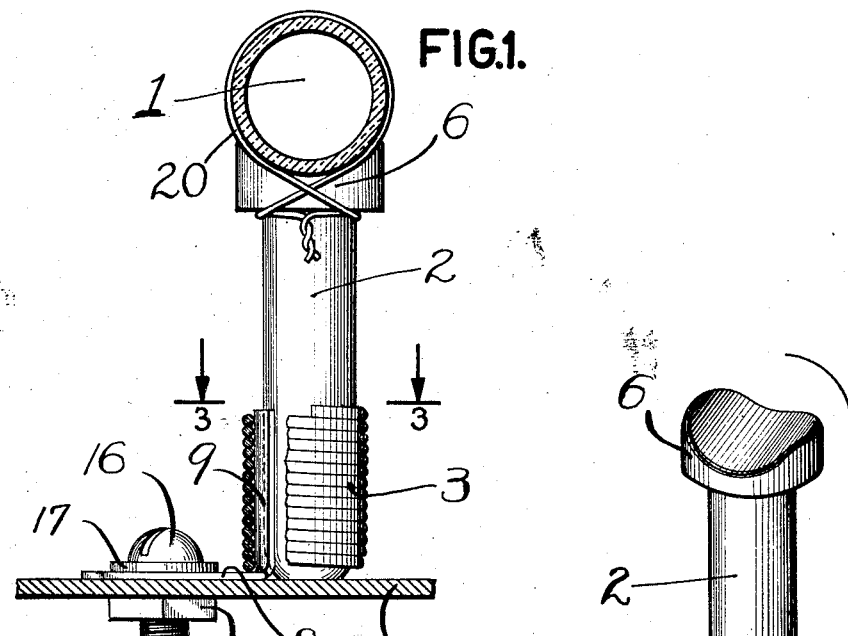
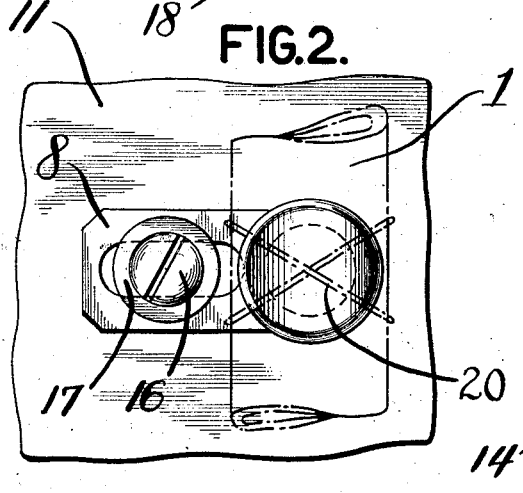
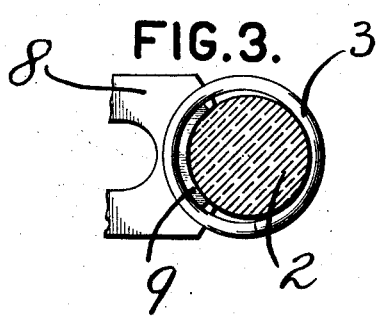
Inventor
Robert C. Smalley
By his Attorneys Patented Aug. 25, 1931

1,820,839

UNITED STATES PATENT OFFICE

ROBERT C. SMALLEY, OF ARLINGTON, NEW JERSEY, ASSIGNOR TO CLAUDE NEON LIGHTS, INC., OF NEW YORK, N. Y., A CORPORATION OF NEW YORK

TUBE SUPPORT

Application filed March 10, 1930. Serial No. 434,619.

This invention relates to supports for tubes particularly gaseous discharge or luminescent tubes.

The invention provides a new and improved support.

The invention will be described by reference to the accompanying drawings which show one embodiment of the invention. It is intended and will be understood that the invention is illustrated by and not limited to such specific embodiment.

Figures 1, 2 and 3 are respectively elevational plan and sectional views of the assembly of the improved support, Figure 3 being a section on the line 3—3 of Figure 1 and Figure 1 being partly in elevation and partly in section with parts broken away to show the assembly more clearly.

Figure 4 shows the separate parts or details of the assembly shown in Figures 1, 2 and 3. Like numerals are employed to designate like parts.

The invention comprises more particularly a combination of elements which act in close cooperation to provide the improved tube support and to perform the desired functions of the same. This combination includes a supporting post 2 provided with a sleeve or cylindrical member 3 having a somewhat larger diameter than the post, and a securing means 5 adapted to engage the sleeve and the post and to secure the post and its sleeve to a base. The securing member is adapted to perform several functions in close cooperation with the other elements of the combination. First it may be interposed as a sort of wedge between the post and sleeve in order to maintain these members in interlocked relation at selectively adjustable relative longitudinal positions of the sleeve and post. Secondly, it may act as a supporting member to hold the supporting post in the desired position. Thirdly it may act as a securing means to permit the device as a whole to be firmly secured to a base.

The post is preferably cylindrical as shown and is preferably made of suitable insulating material such as glass, porcelain, hard rubber, synthetic resin and the like. An enlarged portion at the upper end of the post is provided with a concave arcuate depression adapted to receive a cylindrical tube such as the luminescent tube 1 illustrated diagrammatically in Figure 1 containing a rare gas such as neon. The function of the rare gas is to act as a conducting medium for electric discharge current. The post 2 is provided with a sleeve 3 which is shown in the drawings, as a closely coiled spring. This is the preferred form of the sleeve and in this form the latter is flexible or yieldable both longitudinally and laterally. The securing member 5 is formed of two parts or legs 8 and 9 substantially at right angles to each other. One of these legs 9 is adapted to act as a locking member to hold the post and sleeve in interlocked relation and for this purpose may have as shown a curved configuration which may be substantially concentric with the curvature of the post 2 and of its encircling sleeve 3. By forcibly inserting the said locking member between the sleeve 3 and post 2 the latter may be held in close contact with the sleeve so that the sleeve and post are substantially locked together. However, the combination of parts may readily be disassembled by removing the said securing or locking member 9 and by withdrawing it from the annular space between the sleeve and post.

The other leg 8 of the securing member 5 is adapted to be secured to a base board 11 which may for example, be the base upon which a luminous tube sign is supported. To this end the said leg 8 of the securing member 5 may have a slot 14 as shown in the drawing adapted to reciprocate with the bolt 16, washer 17, nut 18 and base 11.

The sleeve 3 may be adjusted to interlock or be held in close contact with the post at any desired position along the latter and the post and sleeve are also rotatably adjustable with respect to each other. The post has therefore, two substantial degrees of freedom of adjustment, viz: longitudinal and rotatable.

The luminescent or gaseous discharge tube may be secured to the post by any suitable means as for example, a flexible cord or wire 20. The tube receiving portion or head 6 of the post may be integral with the stem portion 2 and made of the same material or may be detachable therefrom and made of different material.

The securing member 5 preferably has the form shown but may have other forms. Instead of having the angle form, as shown, it may for example, have a T-shape, and in some cases may be substantially uni-directional or straight. The leg of the securing member is preferably provided as shown with a more or less elongated slot 14. This provides an additional degree of adjustment. The post member is therefore adjustable laterally and in addition as hereinabove described is also adjustable in a normal direction with respect to the base and is also rotatably adjustable.

It is of substantial advantage to have the sleeve 3 a spring member and in the preferred form of the invention the sleeve 3 is a closely coiled spring for example, as shown in Figs. 1 and 4. When the post 2 is inserted in the sleeve and held in contact therewith, as by the locking member 9, the act of turning the post in a clockwise direction serves to bring the coils of the spiral into a position of maximum proximity, i. e. to "tighten" the spiral and to decrease the diameter of the sleeve 3. This in turn causes a better "grip" between the post 3 and spiral or sleeve 3 and serves to hold the post 3 very securely in a locked position. On the other hand, by turning the post 2 in the opposite or counter clockwise position the spiral is, so to speak, unwound and the diameter of the sleeve 3 somewhat increased, thus permitting the post to be readily removed from the sleeve or moved rotatably or longitudinally within the sleeve.

Adjustment may therefore readily be had by merely turning the post 2 clockwise or counter clockwise as described. The co-operative tightening action which is obtained, as described by turning the post 2 in a clockwise direction is enhanced favorably by having the transverse cross section of the post 2 slightly elliptical so that the post acts to some extent as a cam.

In another form of the invention the securing member 5 and the sleeve 3 may be joined to form a single member.

A preferred embodiment of the invention has been described and illustrated in detail and certain other embodiments have been indicated. Still other forms of the invention are possible, and it is intended and will be understood that the invention is illustrated by and not limited to the precise forms herein described.

What is claimed is:

1. A tube support comprising in combination a supporting post, a sleeve encircling said post, and securing means engaging and maintaining the sleeve and post in interlocked relation at selectively adjustable relative longitudinal positions of the sleeve and the post and being adapted to be secured to a base.

2. A tube support comprising in combination a supporting post, a sleeve encircling said post, and securing means engaging the sleeve and post in the annular space therebetween and maintaining said sleeve and post in interlocked relation and being adapted to be secured to a base.

3. A tube support comprising in combination a supporting post, a sleeve comprising a coiled spring encircling said post, and securing means engaging and maintaining the sleeve and post in interlocked relation at selectively adjustable relative longitudinal positions of the sleeve and the post and being adapted to be secured to a base.

4. A tube support comprising in combination a supporting post, a sleeve comprising a coiled spring encircling said post, and securing means engaging the sleeve and post in interlocked relation at selectively adjustable relative longitudinal positions of the sleeve and the post and being adapted to be secured to a base, said securing means comprising an angle member one leg of said member being adapted for insertion between the post and sleeve and the other leg being adapted to be secured to a base.

5. A tube support comprising in combination a supporting post, a sleeve comprising a coiled spring encircling said post, and securing means adapted to engage the sleeve and post and to secure the same to a base.

6. A tube support comprising in combination a supporting post, a flexible sleeve encircling said post, and securing means which is adapted to engage the sleeve and post and to secure the same to a base, and which is longitudinally and rotatably adjustable with respect to said sleeve and post.

7. A support for mounting vacuum tube lights upon a base plate, comprising a tube receiving element adapted to receive the tube at any point in its length and arranged to maintain said tube spaced from said base plate, a collar adapted to encircle said element, and means slidably adjustable on said collar for securing said element to said base plate.

8. A support for mounting vacuum tube lights upon a base plate, comprising a tube receiving element adapted to receive the tube at any point in its length and arranged to maintain said tube spaced from said base plate, a sleeve adapted to encircle said element and rotatable thereon, and means for securing said sleeve to said base plate.

9. A support for spacing vacuum tube lights from a base plate comprising a tube receiving element arranged to engage said tube at any point in its length and maintain said tube from the base plate, a spring member longitudinally slidable with respect to the said element encircling said element and a second member having means cooperating with the said first mentioned member for resiliently and adjustably supporting said tube receiving element and also having a portion adapted to be fastened to said base plate, the said spring member being longitudinally slidable upon said second member.

10. A support for spacing vacuum tube lights from a base plate comprising a tube light receiving element engaging the tube light at any point in its length, spring means engaging the receiving element and rotatably adjustable therewith, and a bracket slidably adjustable with respect to the spring means and adapted to be anchored to the base plate.

11. A support for spacing vacuum tube lights from a base plate comprising a tube light receiving element engaging the tube light at any point in its length, spring means engaging the receiving element and rotatably and longitudinally adjustable therewith, and a bracket slidably adjustable with respect to the spring means and adapted to be anchored to the base plate.

12. A support for spacing vacuum tube lights from a base plate comprising a tube light receiving element engaging the tube light at any point in its length, a resilient band elastically engaging the receiving element and enabling rotatable adjustment therewith, and a bracket slidably adjustable with respect to the resilient band adapted to be anchored to the base plate.

13. A support for spacing vacuum tube lights from a base plate comprising a tube light receiving element engaging the tube light at any point in its length, a resilient band elastically engaging the receiving element and enabling rotatable and sliding adjustment of the receiving element therewith, and a bracket adapted to be anchored to a base plate carrying the resilient band and slidably adjustable therewith.

14. A support for spacing vacuum tube lights from a base plate comprising a tube light receiving element engaging the tube light at any point in its length, a resilient band elastically engaging the receiving element and enabling rotatable adjustment therewith, and a bracket carrying the resilient band and having an elongated slot therein and adapted to be anchored to the base plate and slidably adjustable therewith.

15. A tube support comprising in combination a supporting post, a cylindrical sleeve which encircles the post and which of itself is loosely slidable upon the post, and a member which is inserted between the post and sleeve and maintains the post and sleeve in interlocked selectively adjustable relative longitudinal positions of the sleeve and post, is longitudinally and rotatably slidable with respect to the sleeve and is adapted to be secured to a base.

16. A tube support comprising in combination a supporting post, a coiled spring sleeve encircling the post and a securing member a part of which is inserted between the post and sleeve, and another part of which is adapted to be secured to a base, which post upon rotation tightens the coiled spring and holds the securing member tightly against said post.

17. A support for mounting luminescent tubes upon a base plate comprising a tube receiving post having a receptacle for the tube said receptacle being arranged and designed so as to maintain the axis of the luminescent tube substantially at right angles with the axis of the receiving element, a flexible curved member having an axis of curvature substantially parallel with the axis of the receiving element, which curved member grasps said element and with respect to which said receiving element is slidable in the direction of the axis of the receiving element and also rotatable, and means to secure said flexible member to a base plate whereby the axis of the receiving element is substantially at a right angle with the plane of the base plate and whereby the axis of the luminescent tube is substantially parallel to the plane of the base plate, said means comprising a member extending substantially at a right angle to the axis of the receiving element.

18. A support for mounting vacuum tube lights upon a base plate, comprising a tube receiving element adapted to receive the tube at any point in its length and arranged to maintain said tubes spaced from said base plate, a spring sleeve clamp adapted to encircle said element and being slidably adjustable thereon, and means for securing said clamp to said base plate, said means being slidably and rotatably adjustable with respect to said base plate.

In testimony whereof I affix my signature.

ROBERT C. SMALLEY.